Patented Apr. 27, 1948

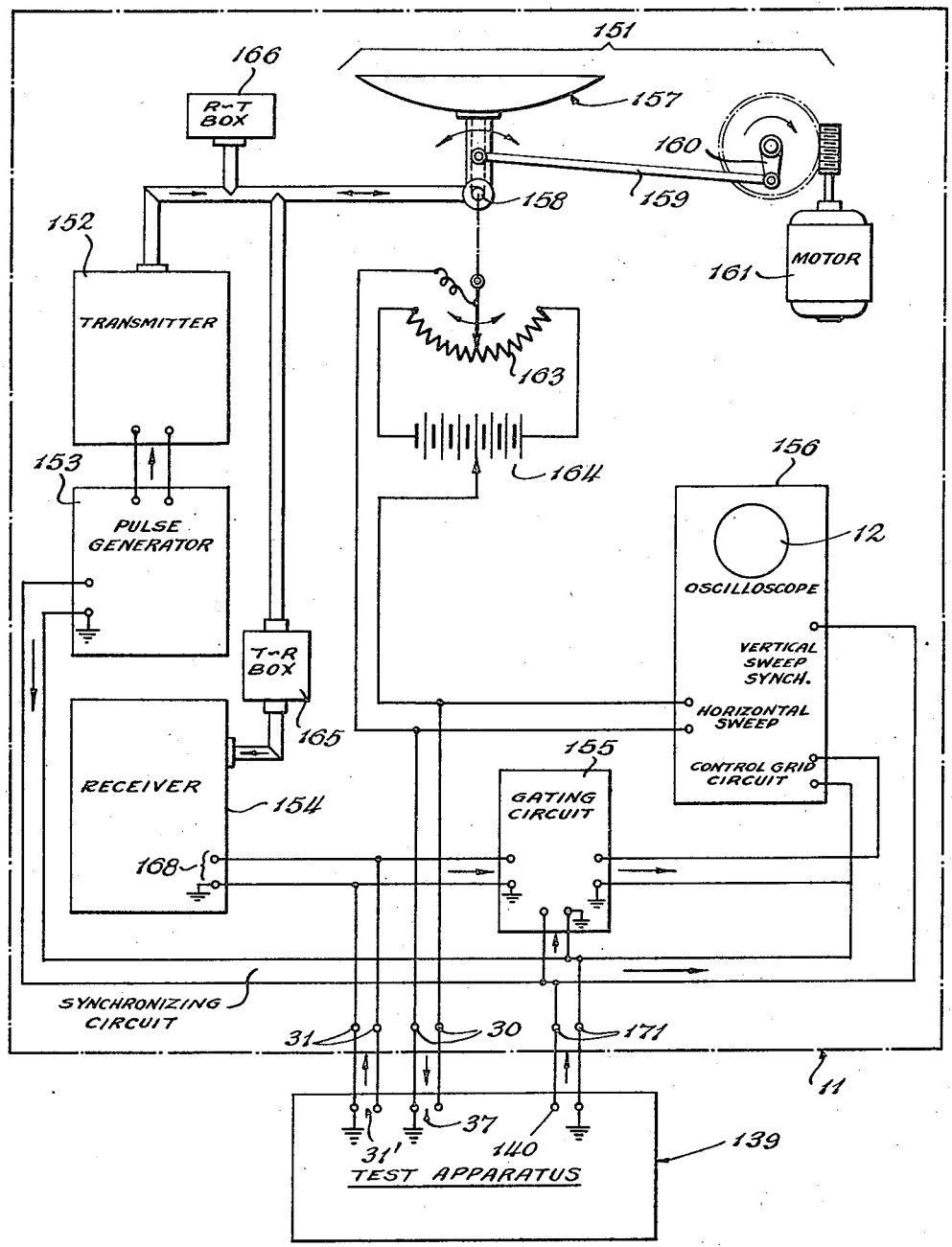

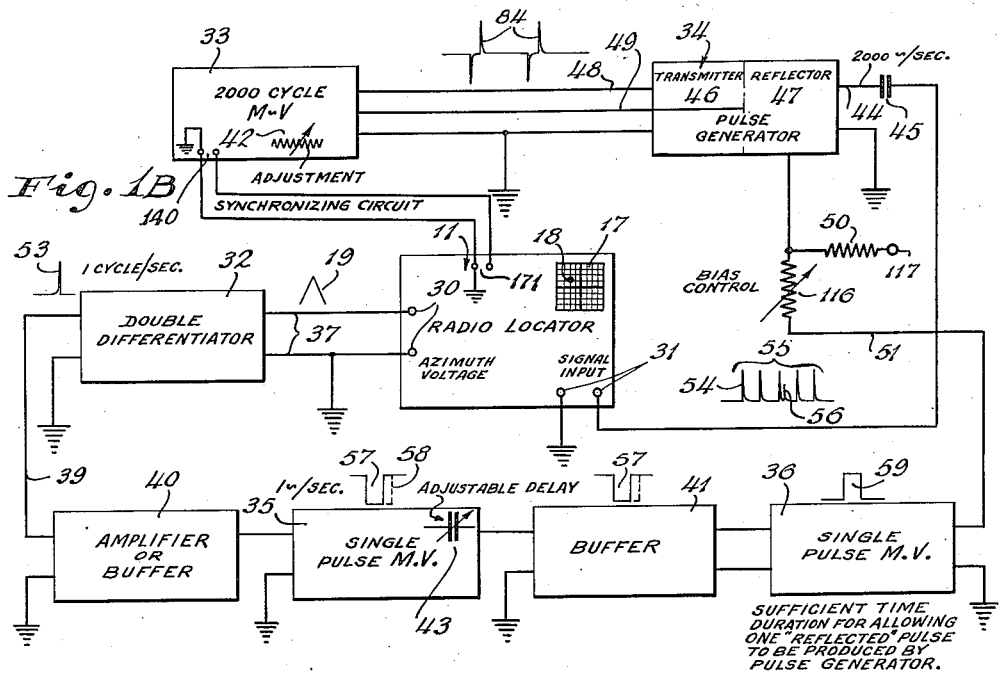
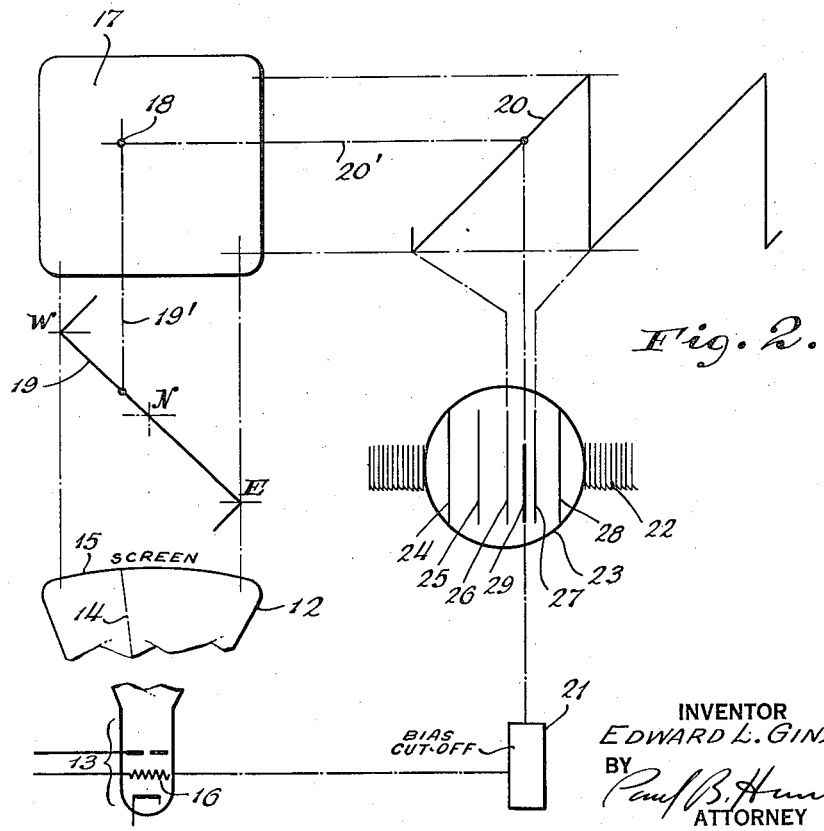

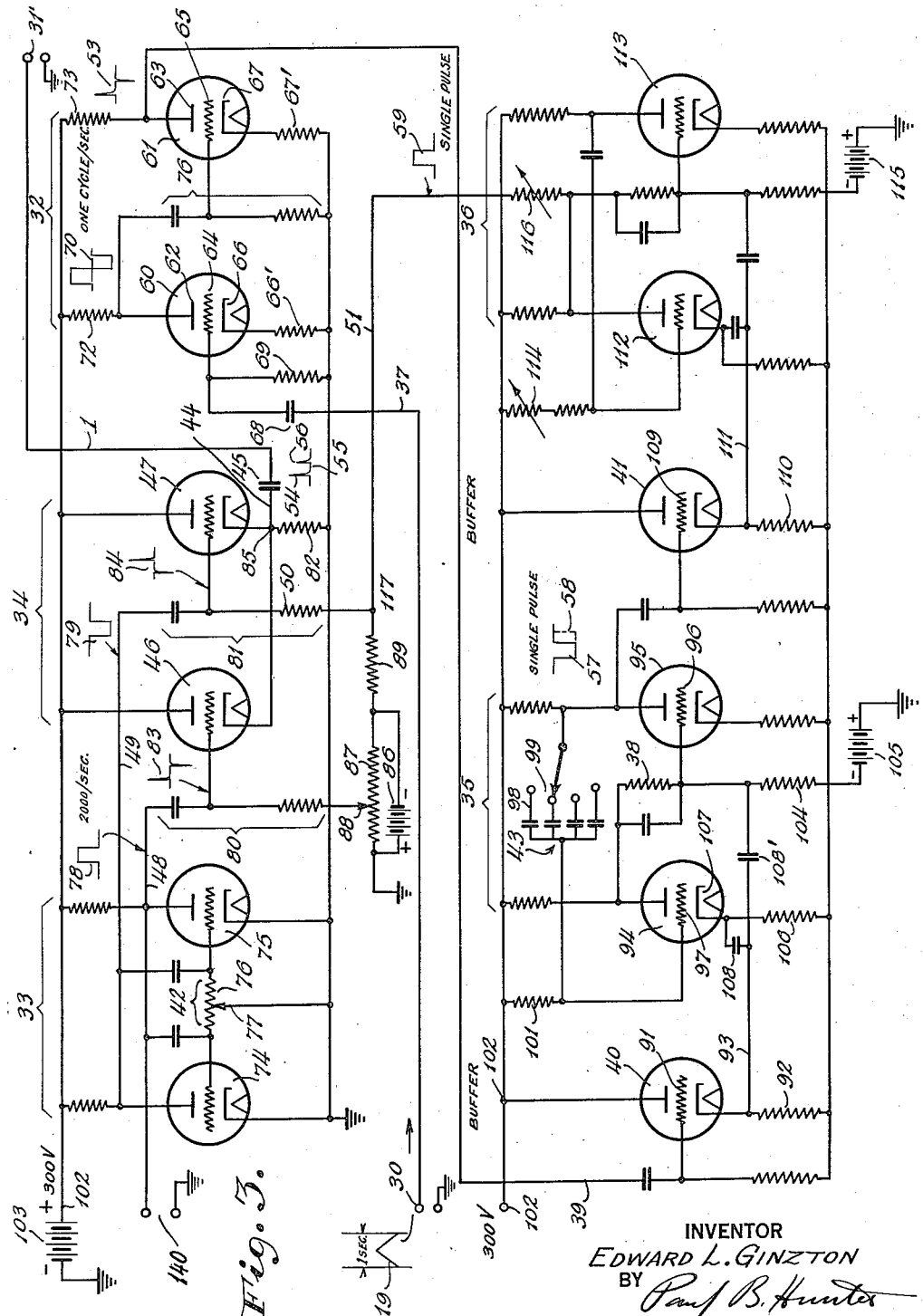

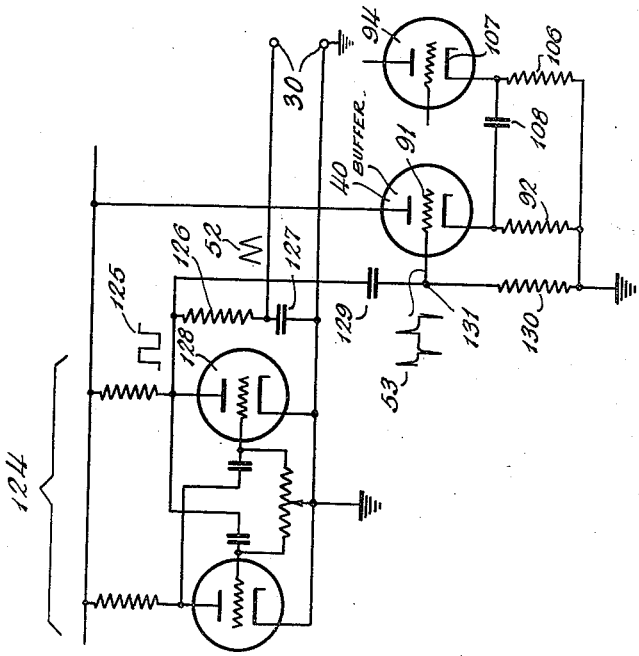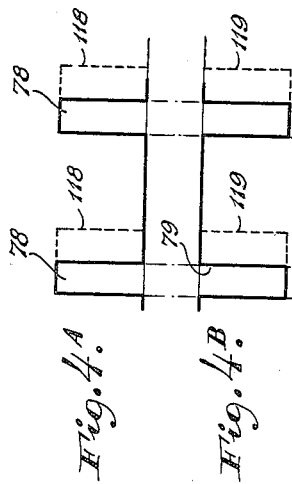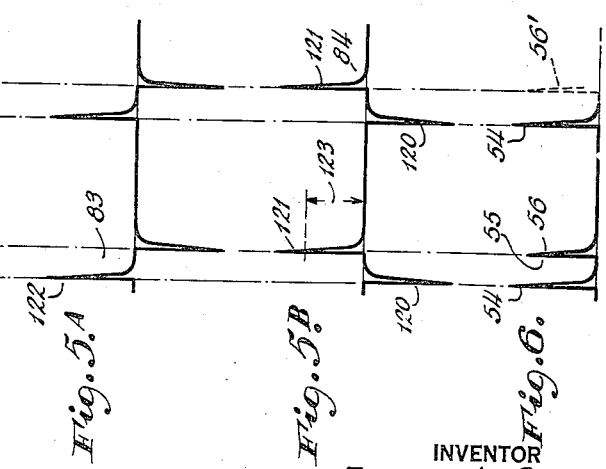

2,440,261

UNITED STATES PATENT OFFICE 2,440,261

RADIO LOCATOR TEST APPARATUS

Edward L. Ginzton, Garden City, N. Y., assignor to The Sperry Corporation, a corporation of Delaware Application May 30, 1945, Serial No. 596,707

10 Claims. (Cl. 250—1.62)

1

This invention relates to testing apparatus and electronic circuits. This patent application is a continuation-in-part of patent application Serial No. 472,794, filed January 18, 1943, now abandoned.

An object of the invention is to provide apparatus for testing electronic circuits and cathode ray devices, especially locating devices of the search or scan type employing transmitted and reflected radio waves.

A specific object of the invention is to provide apparatus for testing object locators of the Azimuth-Search type, which project a beam of ultra high frequency radiation in pulses toward the horizon, and oscillate the beam through a predetermined angle of azimuth, to scan the horizon and thus search for objects which may be invisible but which intercept the projected beam. In case such an object intercepts the projected beam, the beam is reflected and received by the locator. The azimuth of the detected object is indicated by the azimuth of the projector when the projected pulse is intercepted and the range of the detected object is indicated by the time interval between the transmission of the pulse and the reception of its reflection.

These indications are produced graphically by a cathode ray oscilloscope including a cathode ray tube having a deflecting beam, a pair of sweep circuits and a control electrode. The cathode ray oscilloscope beam is deflected horizontally by a triangular wave caused to rise substantially linearly to represent azimuth as the projector is rotated in azimuth. The cathode ray oscilloscope beam is also deflected vertically by a saw-tooth wave representing time duration and therefore range. However, the cathode ray oscilloscope beam is usually held off by its control electrode so that nothing appears upon the cathode ray oscilloscope screen until a reflected pulse is received. The pulse receiver is arranged to energize the cathode ray oscilloscope control electrode upon reception of a reflected pulse so that a spot is produced on the cathode ray oscilloscope screen, the coordinates of which indicate azimuth and range of the detected object or target.

Such locators are intended primarily for locating moving targets from a moving station, such as an airplane. They must function with precision and reliability and yet often cannot be tested under actual operating conditions immediately before being placed in use for their intended service. A test at this time would be highly desirable, since the aircraft on which the locators are mounted must be stored and may have been

2 subjected to adverse conditions during transportation before arriving at the scene of action.

It is accordingly a further object of the invention to provide a synthetic test for such locators, which may be applied without actually generating or reflecting the ultra high frequency energy pulses employed in actual operation of the apparatus.

Other and further objects and advantages will become apparent as the description proceeds.

In carrying out the invention in its preferred form, a vacuum tube circuit is provided for generating voltages simulating the voltages normally produced by the detector of the receiver due to the radio locator pulses and for synchronizing such simulated voltages in any desired phase or timing relation with the horizontal deflection triangular wave, to vary the azimuth-representing position of the spot. Adjustments are also provided for simulating any desired range or any pulse reflection factor, in order to simulate all conditions under which the locator may be used and enable the tester to determine whether the locator indicates correctly on every part of its screen.

A better understanding of the invention will be afforded by the following detailed description considered in connection with the accompanying drawings, and those features of the invention which are believed to be novel and patentable will be pointed out in the claims appended hereto.

In the drawings,

Figs. 1A and 1B are schematic or block diagrams of one embodiment of this invention;

Fig. 2 is a schematic diagram and graphic explanation of the manner of operation of a radio locator to be tested;

Fig. 3 is a circuit diagram of the test apparatus of Figs. 1A and 1B;

Figs. 4A and 4B are graphs illustrating the output waves of a multivibrator unit forming an element of the apparatus of Figs. 1A, 1B and 3;

Figs. 5A and 5B are graphs illustrating the result of differentiating the output waves of Figs. 4A and 4B;

Fig. 6 is a graph illustrating simulated pulses produced by the apparatus; and

Fig. 7 is a fragmentary circuit diagram of a modification-in-part of the apparatus of Figs. 1A, 1B and 3.

Like reference characters are utilized throughout the drawings to designate like components of the apparatus.

A radio locator of the type which may be tested by applying simulated pulses in accordance with this invention is shown schematically within the rectangle 11 in Fig. 1A, and is indicated generally by rectangle 11 in Fig. 1B.

The radio locator 11 comprises a periodically moved directive antenna system 151, a high frequency transmitter 152 periodically excited by a pulse generator 153, a receiver 154, a gating circuit 155 and a cathode ray oscilloscope 156. The periodically moved directive antenna system 151 is shown schematically by way of illustration as including a directive antenna 157 pivoted for oscillation about a vertical bearing 158 and driven through a coupling rod 159 by a crank 160 rotated, as through a worm and gear system, by a motor 161. A potentiometer 163 supplied with potential by battery 164 may be connected mechanically to the antenna 157 and electrically to the horizontal sweep terminals of the oscilloscope 156, for applying to the oscilloscope terminals a voltage varying substantially according to the azimuthal displacement of the antenna 157 from a neutral position. The motor drive system 159, 160, 161 may be so arranged as to drive the antenna 157 at substantially uniform angular speed, so that a nearly triangular azimuth sweep electric wave is produced.

The transmitter 152 and the receiver 154 may be coupled to the antenna 157 through ultra high frequency energy conductors such as hollow-pipe wave guides or coaxial transmission lines. A transmit-receive selective energy transmission device 165 of the ionizable gas-filled resonator type, commonly referred to as a "T-R box," may be connected in the ultra high frequency transmission circuit to the receiver 154, for freely passing low intensity energy intercepted by the antenna 157 to the receiver 154 and for greatly attenuating the high intensity energy pulses supplied by the transmitter 152, to afford some protection of the receiver 154. A generally similar protective device 166, referred to as a "R-T box," may be coupled to the ultra high frequency energy conductor connected to the transmitter 152 for further regulating the distribution of the output energy from transmitter 152 and the energy intercepted by antenna 157. The T-R box 165 and the R-T box 166 are well-known devices for the purposes set forth above and hence need not be discussed here in greater detail.

The receiver 154 may be of the superheterodyne type, and may be arranged to provide at terminals 168 a detected version of the ultra high frequency energy received through the T-R box 165. These detected signals may be applied to the input terminals of a gating circuit 155, which is connected to the pulse generator 153 to receive timing signals therefrom, and to pass to a pair of output terminals only those detected signals from the receiver 154 which occur in the intervals between the timing signals from the pulse generator 153. The output terminals of the gating circuit 155 are connected to the control grid circuit of the oscilloscope 156, in such a way as to produce a variation of the brilliance of the fluorescent spot on the screen of the oscilloscope at the instant when a detected pulse from receiver 154 is passed through the gating circuit 155.

In accordance with the present invention, test apparatus indicated schematically at 139 is connected to test terminals 30, 31 and 171 for test operation of the gating circuit 155 and the oscilloscope 156, and, if desired, for generating a triangular azimuth sweep voltage simulating the voltage normally produced by the movement of the antenna system 151 including potentiometer 163 and battery 164. The test apparatus 139 may be connected to terminals 30 to receive or supply the triangular-wave horizontal sweep voltage corresponding to movement with the antenna 157 of the potentiometer 163; to terminals 31 for applying thereto a voltage simulating the detected output voltage of receiver 154, and to terminals 171 for synchronizing the voltage applied to terminals 31 with a vertical sweep saw-tooth wave oscillator which forms a part of oscilloscope 156.

The radio locator 11 is represented functionally in Fig. 2. One of the elements of the oscilloscope 156 is a cathode ray tube 12 having a conventional "electron gun" 13 for producing a cathode ray beam 14 impinging on a fluorescent screen 15. The electron gun 13 includes a conventional control electrode or grid 16 by means of which the beam 14 may be either cut off or permitted to impinge on screen 15, according to the voltage applied to the control electrode.

The cathode ray tube 12 is so mounted that a face view of its screen 15 appears behind a calibrated transparent chart 17. Coordinate lines which actually appear on the chart 17 are shown in Fig. 1B but are omitted in Figs. 1A and 2 for clarity. At the point on the chart 17 where the cathode ray beam 14 impinges on the screen 15 a spot 18 appears, unless the beam 14 is cut off. The cathode ray tube 12 includes a pair of deflection circuits (not shown) for causing the spot 18 to move along two mutually perpendicular axes. A current or voltage of triangular-wave shape 19 is applied to one deflection circuit for causing horizontal deflection of the beam 18 to represent variations in azimuth of the position of an energy-reflecting target, and a voltage or current having a saw-tooth wave shape 20 is applied to the other deflection circuit for causing vertical deflection of the spot 18 to represent range. The frequency of the wave 19 is relatively slow, for example one cycle per second, and is produced by suitable mechanism within the radio locator 11 such as the sliding brush potentiometer 163. The frequency of the saw-tooth wave 20 is high in comparison with that of the wave 19, for example 2,000 cycles per second. This wave also is produced by suitable mechanism such as a saw-tooth wave electronic circuit within the radio locator 11.

As represented by the guide lines 19' and 20' in Fig. 2, the instantaneous position of the spot 18 relative to the chart 17 depends upon the instantaneous magnitudes of the waves 19 and 20, at the time when the cathode-ray control grid voltage is such a value as to permit the electron beam to impinge on the fluorescent screen.

Normally, however, the spot 18 does not appear on the screen or chart because the cathode-ray tube control grid is normally biased to cut off the electron beam. For this purpose, a cut-off bias device represented by the rectangle 21 (Fig. 2) is provided, having an electrical connection or a coupling to the control grid 16.

The radio locator 11 in normal use radiates recurrent pulses of ultra high frequency energy, as the antenna 157 moves from side to side to vary the azimuthal directivity of the radio object locator. The receiver 154 produces a series of recurrent pulses due to detection of a small portion of the transmitter output energy, and also produces certain additional output pulses varying in strength according to the strength of reflected ultra high frequency energy received from distant objects, and varying in chronological relation to the wave 19 and recurrent receiver output pulses according to the azimuthal direction and the distance, respectively, of an energy-reflecting object. Such pulses are represented in Fig. 2 by the series of vertical lines of the graph 22. Each of the equally spaced vertical lines 24, 25, 26, 27, 28, etc., in the graph 22 represents the receiver output resulting from one transmitted pulse. A receiver output pulse 29, due to detection of energy reflected from a distant object, is illustrated as occurring between recurrent pulses 26 and 27. For illustrating such a reflected pulse more clearly, the center portion of the graph 22 including the vertical lines 24, 25, 26, 27 and 28 and the reflected pulse line 29 has been represented as magnified within the circle 23. The reflected pulse 29 is shown somewhat shorter than the pulse 26 to indicate the absorption of energy and loss resulting in the transmission and return to the radio locator 11. The horizontal spacing between the transmitted pulse 26 and reflected pulse 29 represents the time required by the pulse to travel the distance to the target and back. This time interval is relatively short, being between a microsecond and 500 microseconds. The gating circuit 155, which passes to the oscilloscope 156 the pulses received during the intervals between the uniform recurrent pulses of the transmitter, is responsive to pulse 29, and permits this pulse to overcome the control grid bias in the oscilloscope and to permit the spot 18 to appear thereon.

The saw-tooth wave 20 generated in oscilloscope 156 is synchronized with the pulses generated by the pulse generator 153. Since the instantaneous voltage of the saw-tooth wave 20 increases progressively with time, its voltage at the instant of reception and detection of pulse 29 is proportional to the time delay between the immediately preceding transmitted pulse 26 and the reflected pulse 29, and the vertical coordinate of the spot 18 therefore represents the time required for the pulse to be transmitted and reflected, or the range of the target. Since the target is intercepted only when the microwave projector is directed along the azimuthal direction of the target, the horizontal coordinate of the spot 18 represents the azimuth angle of the target. Accordingly, the appearance of the spot 18 on the cathode ray tube indicates the presence of the target and the location of the spot relative to chart 17 indicates the azimuth angle and range of the target.

In order that such a radio locator may be tested without the necessity for actually producing a projected microwave beam and actually intercepting it by a target, means are provided for simulating the pulse voltages, represented in the graph 22 and shown magnified within the circle 23 of Fig. 2, and means may also be provided for simulating the azimuth sweep voltage wave 19, or for making use of the apparatus within the locator 11 for obtaining such a triangular wave azimuth voltage and synchronizing the simulated pulses therewith.

In the apparatus illustrated in Fig. 1B, such an azimuth voltage is assumed to be available and to appear at a pair of terminals 30 within the radio locator. The locator 11 is shown equipped with a pair of signal input terminals 31 to which simulated pulses may be applied by test apparatus 139, and with a further terminal pair 171 at which synchronizing voltage from the pulse generator 153 is made available for synchronization of the test apparatus 139. The apparatus is made adjustable so that a simulated reflected pulse may be produced at any angle of azimuth. Any desired delay of the reflected pulse relative to the recurrent pulses and, similarly, relative to the saw-tooth wave 20, may be produced to represent a desired target range, and any desired degree of attenuation of the reflected pulse with respect to the transmitted pulse may be produced. In this manner, the radio locator 11 may be tested under a condition simulating the operation of receiver 154 when detecting a target appearing at any azimuth direction, at any range, and under any assumed condition of reflected wave intensity.

The embodiment of the invention illustrated schematically in Fig. 1B comprises a double differentiator 32 for converting the triangular wave azimuth voltage at the terminals 30 into a series of spikes which will have a frequency of one cycle per second if the azimuth voltage has this frequency, an adjustable repeating multivibrator 33 adapted for synchronization with the vertical sweep voltage circuit of the oscilloscope 156, a pulse generator 34 for converting the voltage variations produced by the multivibrator 33 into voltage spikes simulating pulses received by the radio locator in practice, a single-pulse multivibrator 35 synchronized with the output of the double differentiator 32 for producing an adjustable time delay for representing variations in azimuth, and a second single-pulse multivibrator 36 having a small time delay of the order of 500 microseconds for preventing the production of a simulated reflected pulse in the pulse generator 34 except when the device 36 is triggered by the output of the single-pulse multivibrator 35.

The double differentiator 32 has input connections 37 connected to the azimuth voltage terminals 30 of the radio locator 11 and has output connections including the connection 39 to the input of the single-pulse multivibrator 35 for synchronizing the device 35 with the azimuth voltage at the terminals 30. For isolating the devices 32 and 35, a buffer 40 is preferably interposed between the synchronizing input connection 39 and the single-pulse multivibrator 35. Likewise, a second buffer 41 is preferably interposed between the single-pulse multivibrators 35 and 36.

Any desired means for making the multivibrators 33 and 35 adjustable may be utilized, but for the purpose of illustration the multivibrator 33 is shown as having a potentiometer 42 for making it adjustable and the multivibrator 35 as having a variable condenser 43 for making it adjustable. The internal connections of these devices will be described more in detail in connection with the description of Fig. 3.

The pulse generator 34 includes two stages having a common output connection 44 coupled through a coupling condenser 45, for example, to one of the signal input terminals 31 of the radio locator 11. The return connections may be through ground, as represented in the drawings. The two stages of the pulse generator 34, represented in Fig. 1B by the half rectangles 46 and 47, have separate input connections 48 and 49, respectively, leading from two different output terminals or stages of the multivibrator 33. One of the stages of the pulse generator 34, namely, the stage 46 for producing the simulated transmitted pulse, may have a fixed bias. However, the other stage 47 for producing a simulated reflected pulse has a connection represented by a resistor 50 for normally biasing the stage so strongly negative that it is completely cut off. There is, however, a connection 51 to the single-pulse multivibrator 36 for permitting the stage 47 to operate while the device 36 is supplying a bias-reducing voltage. In this manner, the pulse generator 34 produces a reflected pulse only once during the sweep of the azimuth voltage 19 to represent the interception of a single target during sweep of the microwave projector. If desired, additional bias-reducing devices may be provided for lowering the bias at other azimuth angles to represent the interception of a plurality of targets. A bias control adjustment 116 may be provided to permit variation in the height of the reflected pulse 29 (Fig. 2) to represent variations in absorption of the projected microwave pulses.

The triangular azimuth voltage appearing at the terminals 30 is represented in Figs. 1B and 2 by the triangular wave 19. The spike resulting from double differentiation of this wave is represented in Fig. 1B by the wave 53, which is used to synchronize the single-pulse multivibrator 35 with the azimuth wave 19. The repeating multivibrator 33 is arranged for triggering the pulse generator 34 at the proper intervals to form transmitted-pulse-simulating voltage spikes 54, shown in the group 55 in Fig. 1B. The adjustment 42 in the multivibrator 33 is arranged for adjusting the spacing between a reflected-pulse-simulating voltage spike 56 and the preceding one of the transmitted pulses 54.

The single-pulse multivibrator 35 is arranged to produce a negative square wave output represented by the wave 57. The wave 57 has a frequency of one cycle per second, in the case of a one-cycle-per-second azimuth voltage as assumed. As represented by the dotted portion 58 of the square wave 57, the length of the wave 57 is adjustable by adjustment of the condenser 43 to permit variation of the instant during the cycle of the azimuth wave 19 at which the single-pulse multivibrator 36 is triggered. The device 36 is accordingly arranged to respond to a positive voltage variation.

The single-pulse multivibrator 36 is arranged to produce a positive square wave pulse 59 of short duration for application to the bias-reducing connection 51 of the reflected-pulse generator 47 to permit production of a simulated reflected pulse corresponding to an azimuth fixed by the adjustment of the condenser 43 in the single-pulse multivibrator 35. The length of the square wave 59 should in any event be less than the time interval between successive microwave pulses represented by the vertical lines at 22 in Fig. 2, or the equal height lines 54 in the graph 55 of Fig. 1B. Since, however, the time required for the microwave pulses to be transmitted to the target and reflected back to the radio locator 11 is extremely short, I prefer to limit the length of the square wave 59 to the maximum time duration which might conceivably be required for transmission and reflection of the pulse, for example, the length of the square wave 59 may be of the order of 500 microseconds, for testing a system in which there are 2,000 pulses per second.

Various elements of the testing apparatus represented in Fig. 1B are shown in greater detail in Fig. 3. The elements or units represented in Fig. 1B by rectangles 32, 33, 34, 35, 36, 40 and 41, each comprise one or more stages of electric discharge devices of the control electrode type, such as triode vacuum tubes for example. Although I have shown and mentioned triodes by way of illustration, it will be understood that this invention is not limited thereto.

The double differentiator 32 comprises a pair of triode stages 60 and 61 each having its input coupled through a differentiating circuit. The tubes 60 and 61 comprise anodes 62 and 63, control electrodes or grids 64 and 65, and cathodes 66 and 67, respectively. The control electrode 64 is coupled to the positive azimuth voltage terminal 30 through a differentiating circuit comprising a condenser 68 and a grid leak resistor 69. The time constant of the resistance-capacitance combination 68—69 is chosen small in relation to the time duration of the wave 19 so that the wave 19 is differentiated and appears as a rectangular wave 70 at the anode 62 of the tube 60. Control electrode 65 of the tube 61 is in turn coupled through a similar differentiating circuit 76 to the anode 62 so that the spiked wave 53 representing the differential of the wave 70 appears at the anode 63 of the tube 61. It will be understood that the tubes 60 and 61 are provided with load resistors 72 and 73 connected in series with the anode leads. Cathode resistors 66' and 67' may also be utilized for stabilization.

The multivibrator 33 comprises a pair of triodes 74 and 75 having load resistors and having resistance-capacitance cross-coupling between anodes and cathodes in accordance with the conventional multivibrator circuit connection. The control electrodes or grids are also zero biased. For adjustment of the ratio of conducting period of one tube to the other, the potentiometer 42 is provided, comprising a grid-leak or coupling resistor 76, which is connected between the control electrodes of the tubes 74 and 75 and which has an adjustable tap 77 grounded to the cathodes of the tubes 74 and 75. Movement of the tap 77 along the resistor 76 serves to vary the relative time constants of the control circuits of the tubes 74 and 75 and thereby varies the relative lengths of the conducting periods of the tubes, without substantially varying the repetition rate. The arrangement is assumed to be such that the tube 75 produces a rectangular wave 78 which is positive at a given instant and the tube 74 accordingly produces a rectangular wave 79 which is negative at the same instant. A synchronization voltage terminal 140 is connected to the anode of triode 75, for synchronization of the multivibrator 33 with any external device, such as the pulse generator 153, the vertical sweep voltage generator of the oscilloscope 156, or both.

For differentiation of the rectangular wave outputs 78 and 79, differentiating circuits 80 and 81 are provided each consisting of a conventional coupling capacitor and grid-leak resistor having small time constants in relation to the period of the square waves 78 and 79. The time constants of the multivibrator 33 are so chosen that the repetition rate corresponds to the pulse rate of the radio locator 11 to be tested, e. g., 2,000 pulses per second.

The pulse generator 34 comprises a pair of triodes 46 and 47 which are arranged as cathode follower stages with a common cathode resistor 82. Thus, no anode resistors are required in the stages 46 and 47. The differentiating circuit 80 is connected to the control electrode of the tube 46 and the differentiating circuit 81 is connected to the control electrode of the tube 47. Thus, the tube 46 is responsive to the initial positive peak of the differentiated wave 83 and the tube 47 is responsive to the second peak, which is the positive peak of the wave 84, since the wave 84 is derived from the negative rectangular wave 79. Since the pulse generator 34 is of the cathode follower type, its output wave appears at the common cathode connection 85.

For adjusting the height of the pulse produced upon firing of the tube 46 an adjustable bias may be provided for the control electrode of the tube 46. Such an adjustable bias may take the form of a "C" battery 86 having its positive terminal grounded and having a potentiometer 87 connected across it with an adjustable tap 88 connected to the differentiating circuit 80 serving as the input to the tube 46.

The differentiating circuit 81, serving as input to the tube 47, is connected through a resistor 89 to the negative terminal of the "C" battery 86 and the magnitude of the bias voltage provided by source 86 is made great enough for normally biasing the tube 47 so far beyond cut-off that it is not responsive to the positive peaks of the input wave 84, unless a bias-reducing voltage is supplied by the single-pulse multivibrator 36.

The output wave 55 of the pulse generator 34 appears across the common cathode resistor 82. For adjustment of the height of the first spike 54 simulating a transmitted pulse, the tapped potentiometer 87 is provided, and for adjustment of the height of the spike 56 representing the reflected wave, the voltage output of the single-pulse multivibrator 36 is made adjustable in a manner to be described hereinafter.

The buffer 40, as illustrated, comprises a triode vacuum tube connected as a cathode follower having a control electrode 91. This is capacitance coupled through the conductor 39 to the output of the double differentiator 32. There is a cathode resistor 92 with an output connection 93 from the cathode of the tube 40.

The single-pulse multivibrator 35 comprises a pair of triodes 94 and 95 with direct resistance coupling between the tube 94 and the control electrode 96 of the tube 95. If desired, the coupling resistor 38 may be by-passed by a capacitor. For adjustment of the length of the square wave output or the delay provided by the circuit, an adjustable capacitance coupling 43 is provided between the tube 95 and the control electrode 97 of the tube 94. Such adjustable coupling may be provided by means of a variable capacitor or a bank of capacitors 98 having different capacitances, any one of which may be selected by means of a selector switch 99. To insure termination of the oscillation of the multivibrator 35 after a single pulse, the control electrode 97 of one stage 94 is positively biased by connecting its grid-leak resistor 101 to the positive terminal 102 of the anode supply source 103. Furthermore, the control electrode 96 of the other stage 95 is negatively biased by connecting its grid-leak resistor 104 to the negative terminal of a source of bias voltage such as a "C" battery 105 having its positive terminal grounded. For triggering the single-pulse multivibrator 35 from the output of the buffer 40, a cathode resistor 106 is provided in series with the cathode connection of the tube 94 and the cathode 107 is coupled by a coupling capacitor 108 to the output lead 93 of the buffer 40. The lead 93 may also be coupled by a second coupling capacitor 108' to the control electrode 96 of the tube 95.

The arrangement is such that the tube 95 is normally non-conducting and, therefore, a negative rectangular wave 57 appears at the anode of the tube 95 whenever the single-pulse multivibrator 35 is triggered. This negative output is coupled to the control electrode 109 of the buffer 41 by conventional small-time-constant resistance-capacitance coupling serving as a differentiator and the buffer 41 is arranged as a cathode follower stage having a cathode resistor 110 and an output connection 111 connected to the cathode end of the resistor 110.

The single-pulse multivibrator 36 also comprises a pair of triodes 112 and 113, the former of which is positively biased through a grid-leak resistor 114, which is made adjustable to permit adjustment in the length of the square wave output 59. The other triode 113 is negatively biased by means of a conventional negative bias source such as a "C" battery 115. Although the single-pulse multivibrator 36 is similar in its connections to the single-pulse multivibrator 35, the time constants are very much different. The time constants of the coupling circuits of the single-pulse multivibrator 35 are so chosen that the variation of coupling capacitance by selection of different capacitors by the bank 98 permits variation in the length of the rectangular wave 57 from a fraction of a second to nearly a second, assuming that the apparatus is to be used in connection with the testing of a radio locator having an azimuth wave 19 with a frequency of one cycle per second. The time constants of the single-pulse multivibrator 36 are so chosen, however, that the length of the positive square wave 59 appearing at the anode of the tube 112 is of the order of 500 microseconds.

The square wave output 59 of the single-pulse multivibrator 36 is taken from the anode of the tube 112 and applied through an adjustable resistor 116 to a point 117 in the control electrode circuit of the tube 47 of the pulse generator 34. The constants are so chosen that the tube 47 is normally biased further beyond cut-off than the height of the positive spike of its input wave 84, and the appearance of the rectangular wave 59 reduces the negative bias sufficiently so that it is made a fraction of the height of the positive spike of the input wave 84 of the tube 47. Adjustment of the resistor 116 permits adjustment of the positive voltage introduced in the negative bias circuit of the tube 47, and therefore permits adjustment of the reduction in bias so that height of the second spike 56 in the wave 55 simulating a reflected pulse may be adjusted to represent variations in absorption of the actual reflected pulse.

The output waves of the multivibrator 33 and the pulse generator 34 are illustrated more exactly in Figs. 4A to 6. In these figures, voltage is measured in the vertical direction and time in the horizontal direction. Thus, Fig. 4A illustrates the positive rectangular wave shape appearing at the anode of the tube 75. A dotted portion 118 of the rectangular wave 78 represents variation in length (or time duration) of the square wave which may be produced by varying the relative length of conducting periods of the tubes 74 and 75 by adjustment of the tap 77 on resistor 76. Corresponding negative square waves 79 appear at the anode of the other multivibrator tube 74, and a corresponding adjustment in length of the square wave represented by the dotted line 119 is permitted by adjustment of the tap 77.

Differentiation of the square waves 78 and 79 is represented in Figs. 5A and 5B. The time intervals between the positive and negative spikes of the waves 83 and 84 shown in Figs. 5A and 5B may be adjusted by adjustment of the tap 77 so as to correspond to the lengths of the square waves 78 and 79. For example, referring to Fig. 5B, the time interval between the negative spike 120 and the positive spike 121 may be adjusted in the manner just described. The negative spike 120 occurs at the same instant as the positive spike 122 of the wave 83 shown in Fig. 5A. Since the pulse generator tubes 46 and 47 are responsive only to positive input voltages, the tube 46 will be responsive to the positive spike 122 of the wave 83 and the tube 47 will be responsive to the positive spike 121 of the wave 84. Accordingly, if both positive spikes 122 and 121 are permitted to appear at the respective control electrodes of the tubes 46 and 47 a double spike output wave 55, shown in Fig. 6, will appear across the cathode resistor 82 of the pulse generator 34. The spacing between the first and second spikes 54 and 56 will be determined by the spacing between the positive spikes 122 and 121 of the waves 83 and 84, respectively, and therefore may be adjusted by adjustment of the tap 77 in the multivibrator 33. Normally, however, the control electrode of the pulse generator tube 47 is biased far beyond cut-off and the second spike 56 does not appear in the output wave 55, as indicated by the dotted representation 56' in Fig. 6.

The voltage output of the single-pulse multivibrator 36 is such that the negative bias of the tube 47 is reduced to a value such as represented by the arrows 123 in Fig. 5B for example, which permits the second spike 56 to appear in the wave 55 but to have a smaller magnitude than the first spike 90. Adjustment of the remaining negative bias 123 of the tube 47 by adjustment of the resistor 116 in the single-pulse multivibrator 36 permits adjustment of the height of the second pulse 56. The length of the square wave output 59 of the single-pulse multivibrator 36 is made sufficient so that it will permit appearance of the second spike 56 in the wave 55 when desired, regardless of the setting of the tap 77 determining the length of the square waves 78 and 79. Obviously, the length of the wave 59 need be no greater than the interval between successive square waves 78 or 79.

When an operator wishes to test the radio locator 11 by means of testing apparatus of the type just described, the input terminals 37 of the test apparatus are connected to the azimuth voltage terminals 30 of the radio locator 11; the synchronization terminals 140 of the test apparatus are connected to the corresponding terminals 171 of the radio locator; and the signal output terminals 31' of the test apparatus are connected to the signal terminals 31 of the radio locator 11. The potentiometer 42 is adjusted to represent variations in range in order to cause the spot 18 to appear at different heights relative to the chart 17 and the selector switch 99 is adjusted to represent variations in azimuth and cause appearance of the spot 18 at various positions in a horizontal direction along the chart 17. In order to represent the variations in absorption of the reflected wave causing variations in height of the reflected wave representation 29 (Fig. 2) the resistor 116 in the single-pulse multivibrator 36 is adjusted. Thus, the response of the radio locator 11 to the various indications which it may be expected to receive in practice will be determined, and any defects in the apparatus or any regions of the chart in which the indication is indistinct may be ascertained before the radio locator 11 is placed in actual service.

Inasmuch as the repetition rate of the pulses is ordinarily very high in relation to the frequency of the azimuth sweep in object locators of the Azimuth-Search type, for example, in the ratio 2,000 to 1, it is not necessary in such cases to provide any means of synchronizing the simulated pulses with the azimuth sweep.

In the apparatus thus far described, it has been assumed that the azimuth voltage 19 is to be taken from the radio locator 11. However, if desired, the azimuth voltage may also be simulated by the test apparatus, so that the antenna 157 need not be driven by the motor 161 for the test. For this purpose, an additional multivibrator stage 124 illustrated in Fig. 7 may be included in the test apparatus 139. This multivibrator stage is similar in connections and principle of operation to the multivibrator 33 described above. The multivibrator 124, however, has such time constants that it produces a rectangular output wave 125 which has a frequency of one cycle per second, assuming that a one-cycle-per-second azimuth wave 19 is to be simulated. For converting the square wave 125 into a substantially triangular azimuth wave 52, an integrating circuit is provided consisting of a resistor 126 and a capacitor 127 in series connected across the second tube 128 of the multivibrator 124. The triangular wave appears across the capacitor 127 and is applied to the azimuth sweep wave terminals 30 to produce an azimuth sweep since it is assumed that the azimuth voltage is to be supplied externally. In this case, the double differentiator 32 of Figs. 1B and 3 is not needed and synchronizing pulses are taken from the anode of the tube 128 of the multivibrator 124 through a differentiating circuit comprising a capacitor 129 and a resistor 130 connected in series across the tube 128, the synchronizing pulses 53 then appearing across the resistor 130. The junction terminal 131 of the differentiator 129—130 may be connected to the control electrode 91 of the buffer tube 40 shown in Fig. 3. The buffer tube 40 is in turn coupled to the tubes 94 and 95 of the single-pulse multivibrator 35 of Fig. 1B, as illustrated in detail in Fig. 3, and the remainder of the apparatus may be as illustrated in Figs. 1B and 3.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for producing simulated pulses for testing a recurrent-pulse radio locator having azimuth sweep voltage wave terminals and including a directional pulse projector periodically sweeping through a range of directions, said apparatus comprising a pair of input terminals for connection to the azimuth sweep voltage wave terminals of said radio locator at which a triangular sweep voltage wave appears having a frequency corresponding to the directional sweep frequency of the pulse projector of said radio locator, a double differentiator for forming from such a triangular sweep voltage wave synchronizing spikes of the same frequency, a two-stage repeating multivibrator circuit having an adjustment for permitting variation of the ratio of on and off periods of one stage of the multivibrator with respect to the other, said multivibrator having a frequency corresponding to the repetition rate of recurrent pulses of said radio locator, a pair of differentiators connected to opposite-polarity output terminals of said multivibrator, a two-stage pulse generator having one stage connected to one of said differentiators and the other stage connected to the other of said differentiators, said two stages having common output terminals and having means for normally biasing one stage of the pulse generator sufficiently beyond cut-off to prevent response to input differentiated waves, a first single-pulse multivibrator synchronized by said synchronizing spikes and having an adjustment to permit variation in delay of the order of the period of an azimuth wave used in said radio locator, a second single-pulse multivibrator arranged to be triggered by the output of said first single-pulse multivibrator and having a pulse duration of the order of the interval between pulses produced by the radio locator to be tested, and an output connection between said second single-pulse multivibrator and the bias circuit of said one stage of said pulse generator for rendering said one stage of the pulse generator effective for the duration of the output wave of the second single-pulse multivibrator, whereby simulated transmitted pulses are produced in said pulse generator and a simulated reflected pulse is produced therein occurring at an instant in relation to the azimuth sweep voltage wave determined by the adjustment of the first single-pulse multivibrator and having a range-indicating delay determined by the adjustment of the repeating pulse multivibrator.

2. Recurrent pulse radio locator testing apparatus comprising a unit for producing a triangular directional sweep voltage wave, a unit for producing square waves with a repetition rate corresponding to the repetition rate of the recurrent pulses of the radio locator, apparatus for converting said square waves into pairs of positive spikes with means for normally suppressing the second of each pair of spikes, an adjustable delay device supplied with said triangular sweep voltage wave for producing an output voltage having adjustably delayed discontinuities, and a unit triggered by the output voltage of said delay device for momentarily overcoming the suppression of said second spike, whereby simulation of variations in radio locator target range may be produced by variation in length of the square waves produced by said square wave device, and variations in radio locator target direction may be simulated by adjustment of the delay device to determine the time instant in relation to the directional sweep voltage wave at which the second spike of one of said pairs of spikes is permitted to appear unsuppressed.

3. Recurrent pulse radio locator testing apparatus comprising a unit for producing square waves with a repetition rate corresponding to the repetition rate of the recurrent pulses of the radio locator, apparatus for converting said square waves into pairs of positive spikes with means for normally suppressing the second of each pair of spikes, and a unit for overcoming the suppressing of the second spike of a selected pair of spikes whereby pulses transmitted by said radio locator are simulated by the first spike of such pairs of spikes and the reflection of one of said pulses is simulated by the second spike of said selected pair.

4. Recurrent pulse radio locator testing apparatus comprising an adjustable unit for producing square waves with a repetition rate corresponding to the repetition rate of the recurrent pulses of the radio locator and with adjustable time duration of said square waves, apparatus for converting said square waves into pairs of positive spikes with means for normally suppressing the second of each pair of spikes, and a unit for overcoming the suppression of one of said second spikes whereby simulation of variations in radio locator target range may be produced by variation in length of the square waves produced by said square wave device, the first spike of each pair simulating a pulse transmitted by said radio locator, and the unsuppressed second spike of a pair simulating a reflection of a transmitted pulse from a radio locator target.

5. Recurrent pulse, periodically direction-varying radio locator testing apparatus comprising a pair of input terminals for connection to a source of a triangular electric wave corresponding to the periodical directional variations of the radio locator, means for producing pairs of positive pulses having a high repetition rate in comparison with the frequency of said triangular electric wave, adjusting means for varying the time interval between the pulses of each pair, means for normally cutting off the second pulse of each pair, an adjustable time delay device responsive to said triangular electric wave and synchronized therewith, and means triggered by said time delay device for counteracting said pulse-cut-off means and permitting the production of the second pulse of a pair for simulating a reflected pulse at a time in relation to said triangular electric wave determined by the setting of said adjustable time delay device.

6. Apparatus for producing simulated pulses for testing a recurrent pulse radio locator producing an electric azimuth sweep signal, said apparatus comprising a unit for producing square waves with a repetition rate corresponding to the repetition rate of the recurrent pulses of said radio locator, said rate being high in comparison with the frequency of the electric sweep signal, apparatus for converting said square waves into pairs of positive spikes with means for normally suppressing the second spike of each of said pairs of spikes, an adjustable delay device with means receiving said azimuth sweep signal and synchronized therewith, and a unit triggered by said delay device for momentarily overcoming the suppression of said second spike, whereby simulation of variations in radio locator target range may be produced by variation in length of the square waves produced by said square wave device, and variations in radio locator target azimuth direction may be simulated by adjustment of the delay device to determine the time instant at which the second spike of a pair is permitted to appear.

7. Recurrent pulse radio locator testing apparatus comprising a pulse generator for periodically producing pairs of pulses at a rate corresponding to the recurrent pulse repetition rate of the radio locator, means connected to said generator for normally suppressing the second of each pair of pulses, and a unit for periodically overcoming the suppressing of said second pulses whereby transmitted pulses of said radio locator are simulated by the first of each pair of pulses and reflections of some transmitted pulses are simulated by said unsuppressed pulses.

8. Radio locator testing apparatus as defined in claim 7, including means for adjusting the time period between pulses in each pair to simulate variations in radio locator target range.

9. Recurrent pulse periodically scanning radio locator testing apparatus comprising a pulse generator for periodically producing pairs of pulses at a rate corresponding to the recurrent pulse repetition rate of the radio locator, means connected to said generator for normally suppressing the second of each pair of pulses, a unit coupled to said radio locator and controlled synchronously with the scanning of said radio locator for periodically overcoming the suppressing of said second pulses, and delay means in said unit for adjusting the phase relation of the operating period of said unit with respect to said scanning whereby transmitted pulses of said radio locator are simulated by the first of each pair of pulses and reflections of some transmitted pulses are simulated by said unsuppressed pulses.

10. Apparatus for testing a radio locator having a cathode-ray oscilloscope including a horizontal deflection circuit and a vertical deflection circuit, a sweep voltage generator of a first frequency coupled to said horizontal deflection circuit, a saw-tooth wave generator coupled to said vertical deflection circuit and arranged for external synchronization with recurrent pulses of a second frequency appreciably greater than said first frequency, and means for receiving recurrent pulses of said second frequency for synchronization of said saw-tooth wave generator and receiving occasional pulses during intervals between said recurrent pulses and selectively applying said occasional pulses to said oscilloscope to produce abrupt variations of brilliance thereof in accordance with said occasional pulses; said testing apparatus comprising: first multivibrator means responsive to the horizontal deflection voltage generator for producing fixed-duration voltage impulses synchronized therewith in adjustable phase relation, second multivibrator means for generating a first series of recurrent pulses at said second frequency for synchronization with the vertical deflection saw-tooth generator and for generating a second series of recurrent pulses at said second frequency adjustably spaced from said first pulses, means responsive to said first multivibrator means and operatively coupled to said second multivibrator means for selecting the pulses of said second series coincident with said fixed-duration voltage impulses and blocking the remaining pulses of said second series, and means for applying said first series recurrent pulses and the selected pulses of said second series to the pulse receiving means of the radio locator.

EDWARD L. GINZTON.

REFERENCES CITED

The following references are of record in the file of this patent:

UNITED STATES PATENTS

| Number | Name | Date |
|---|---|---|
| 2,355,363 | Christaldi | Aug. 8, 1944 |